US011892297B2

(12) United States Patent
Ramakrishnan et al.

(10) Patent No.: US 11,892,297 B2
(45) Date of Patent: Feb. 6, 2024

(54) SCALABLE GRAPH SLAM FOR HD MAPS

(71) Applicant: Robert Bosch GmbH, Stuttgart (DE)

(72) Inventors: Naveen Ramakrishnan, Campbell, CA (US); Sauptik Dhar, Santa Clara, CA (US); Jeff Irion, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 772 days.

(21) Appl. No.: 16/971,413

(22) PCT Filed: Feb. 22, 2019

(86) PCT No.: PCT/EP2019/054467
§ 371 (c)(1),
(2) Date: Aug. 20, 2020

(87) PCT Pub. No.: WO2019/162452
PCT Pub. Date: Aug. 29, 2019

(65) Prior Publication Data
US 2021/0003398 A1 Jan. 7, 2021

Related U.S. Application Data

(60) Provisional application No. 62/634,327, filed on Feb. 23, 2018.

(51) Int. Cl.
G01C 21/00 (2006.01)
G01C 21/20 (2006.01)
G06F 16/13 (2019.01)
G06F 17/12 (2006.01)

(52) U.S. Cl.
CPC ........... *G01C 21/20* (2013.01); *G06F 16/134* (2019.01); *G06F 17/12* (2013.01)

(58) Field of Classification Search
CPC ........ G01C 21/20; G06F 16/134; G06F 17/12
USPC ......................................... 701/409
See application file for complete search history.

(56) References Cited

U.S. PATENT DOCUMENTS

2017/0019315 A1* 1/2017 Tapia ................. H04L 41/0631
2018/0218088 A1* 8/2018 Fischer ................ G06F 16/284

OTHER PUBLICATIONS

Choudhary et al., "Exactly Sparse Memory Efficient SLAM using the Multi-Block Alternating Direction Method of Multipliers", Sep. 2015, IEEE, 8 pages (Year: 2015).*

(Continued)

*Primary Examiner* — Mahmoud S Ismail
(74) *Attorney, Agent, or Firm* — Maginot, Moore & Beck LLP

(57) ABSTRACT

A method of solving a graph simultaneous localization and mapping (graph SLAM) for HD maps using a computing system includes partitioning a graph into a plurality of subgraphs, each of the subgraphs having all of the vertices of the graph and a subset of the edges of the graph. Constrained and non-constrained vertices are defined for the subgraphs. An alternating direction method of multipliers (ADMM) formulation for Graph SLAM is defined using the partitioned graph. A distributed Graph SLAM algorithm is then defined in terms of the constrained and non-constrained vertices based on the ADMM formulation. The distributed Graph SLAM algorithm is then used to solve the Graph SLAM problem for HD maps.

6 Claims, 1 Drawing Sheet (a)

(b)

(56) References Cited

OTHER PUBLICATIONS

Kümmerle, R. et al., "g2o: A General Framework for Graph Optimization," IEEE International Conference on Robotics and Automation (ICRA), May 2011, pp. 3607-3613 (7 pages).

Forster, C. et al., "IMU Preintegration on Manifold for Efficient Visual-Inertial Maximum-a-Posteriori Estimation," Georgia Institute of Technology, 2015 (10 pages).

HP Vertica, Website, About, Internet Archive version dated Sep. 8, 2015, available at https://web.archive.org/web/20150908100849/https://www.vertica.com/about/ (2 pages).

Pivotal Web Services, Website, Internet Archive version dated Feb. 10, 2018, available at https://web.archive.org/web/20180210201347/http://run.pivotal.io/ (5 pages).

Apache Spark, Website, Internet Archive version dated Feb. 21, 2018, available at https://web.archive.org/web/20180221194730/https://spark.apache.org/ (2 pages).

Zinkevich, M. et al., "Parallelized Stochastic Gradient Descent," Advances in Neural Information Processing Systems 23 (NIPS 2010), 2010 (9 pages).

Niu, F. et al., "Hogwild: A Lock-Free Approach to Parallelizing Stochastic Gradient Descent," Advances in Neural Information Processing Systems 24 (NIPS 2011), 2011 (9 pages).

Zhang, Y. et al., "Splash: User-friendly Programming Interface for Parallelizing Stochastic Algorithms," arXiv:1506.07552v2 [cs.LG] Sep. 23, 2015 (27 pages).

Shamir, O. et al., "Communication-Efficient Distributed Optimization using an Approximate Newton-type Method," Proceedings of the 31st International Conference on Machine Learning, 2014, PMLR 32(2) (9 pages).

Zhang, Y. et al., "DiSCO: Distributed Optimization for Self-Concordant Empirical Loss," Proceedings of the 32nd International Conference on Machine Learning, 2015, PMLR 37 (9 pages).

Mahoney, M. W., "Randomized Algorithms for Matrices and Data," Foundations and Trends in Machine Learning, 2010, vol. 3, No. 2 (104 pages).

Heinze, C. et al., "LOCO: Distributing Ridge Regression with Random Projections," arXiv:1406.3469v4 [stat.ML] Jun. 8, 2015 (37 pages).

Parikh, N. et al., "Proximal Algorithms," Foundations and Trends in Optimization, 2013, vol. 1, No. 3 (113 pages).

Becker, S. et al., "A quasi-Newton proximal splitting method," Advances in Neural Information Processing Systems 25 (NIPS 2012), 2012 (9 pages).

Boyd, S. et al., "Distributed Optimization and Statistical Learning via the Alternating Direction Method of Multipliers," Foundations and Trends in Machine Learning, 2010, vol. 3, No. 1, 1-122 (125 pages).

Carlone, L. et al., "Eliminating Conditionally Independent Sets in Factor Graphs: A Unifying Perspective based on Smart Factors," IEEE International Conference on Robotics & Automation (ICRA), May-Jun. 2014, pp. 4290-4297 (8 pages).

Dhar, S. et al., "ADMM based Scalable Machine Learning on Spark," IEEE International Conference on Big Data (Big Data), Oct.-Nov. 2015, pp. 1174-1182 (9 pages).

Keuper, J. et al., "Asynchronous Parallel Stochastic Gradient Descent A Numeric Core for Scalable Distributed Machine Learning Algorithms," Proceedings of the Workshop on Machine Learning in High-Performance Computing Environments (MLHPC2015), Nov. 2015 (11 pages).

Bonnans, J. F. et al., "A family of variable metric proximal methods," Mathematical Programming, vol. 68, 1995, pp. 15-47 (33 pages).

Oliphant, J. et al. "SciPy: Open Source Scientific Tools for Python," 2001, Internet Archive available at https://web.archive.org/web/20180624105556/www.scipy.org/citing.html (archive date Jun. 24, 2018) (3 pages).

Parente, L.A., et al., "A class of inexact variable metric proximal point algorithms," SIAM Journal on Optimization, vol. 19, No. 1, pp. 240-260, 2008 (21 pages).

Lee, J. D. et al., "Proximal newton-type methods for minimizing composite functions," SIAM Journal on Optimization, vol. 24, No. 3, pp. 1420-1443, 2014 (24 pages).

International Search Report corresponding to PCT Application No. PCT/EP2019/054467, dated Jun. 5, 2019 (3 pages).

Choudhary, S. et al., "Exactly Sparse Memory Efficient SLAM using the Multi-Block Alternating Direction Method of Multipliers," IEEE/RSJ International Conference on Intelligent Robots and Systems (IROS), Sep. 2015 (8 pages).

Grisetti, G. et al., "A Tutorial on Graph-Based SLAM," IEEE Intelligent Transportation Systems Magazine, vol. 2, No. 4, pp. 31-43, Feb. 4, 2011 (13 pages).

Huang, G. et al., "Consistent Sparsification for Graph Optimization," 2013 European Conference on Mobile Robots (ECMR), 150-157, Sep. 25, 2013 (8 pages).

Paull, L. et al., "A Unified Resource-Constrained Framework for Graph SLAM," 2016 IEEE International Conference on Robotics and Automation (ICRA), pp. 1346-1353, May 16, 2016 (8 pages).

Zhao, L. et al., "Linear SLAM: A Linear Solution to the Feature-based and Pose Graph SLAM based on Submap Joining," 2013 IEEE/RSJ International Conference on Intelligent Robots and Systems (IROS), pp. 24-30, Nov. 3, 2013 (7 pages).

* cited by examiner

SCALABLE GRAPH SLAM FOR HD MAPS

CROSS-REFERENCE TO RELATED APPLICATIONS

This application is a 35 U.S.C. § 371 National Stage Application of PCT/EP2019/054467, filed on Feb. 22, 2019, which claims priority to U.S. Provisional Application Ser. No. 62/634,327, filed on Feb. 23, 2018, the disclosures of which are incorporated herein by reference in their entirety.

TECHNICAL FIELD

The present disclosure is directed to systems and methods for solving Graph SLAM problems, and, in particular, to systems and methods for solving Graph SLAM problems for HD maps.

BACKGROUND

The aim of Graph SLAM is to find the set of poses $\{x_1, x_2, \ldots, x_N\}$ that minimizes the cost functional $$\chi^2(x) = \Sigma_{e_{ij} \in \varepsilon} (e_{ij}(x))^T \Omega_{ij} e_{ij}(x), \quad (1)$$

where $x = (x_1^T, x_2^T, \ldots, x_N^T)$. This is typically solved in an iterative manner whereby each iteration k entails approximating the cost functional, finding the optimal set of pose updates $\Delta x^k$, and computing the next set of poses via $$x^{k+1} = x^k \boxplus \Delta x^k, \quad (2)$$

where $\boxplus$ denotes a pose composition operator. Let d denote the dimensionality of the pose updates (i.e., $\Delta x^k \in \mathbb{R}^{dN}$). Substituting (2) into (1), we compute the gradient $b^k \in \mathbb{R}^{dN}$ and the Hessian matrix $H^k \in \mathbb{R}^{dN \times dN}$ of the $\chi^2$ error as $$\chi^2(x^{k+1}) = \sum_{e_{ij} \in \varepsilon} (e_{ij}(x^k \boxplus \Delta x^k))^T \Omega_{ij} e_{ij}(x^k \boxplus \Delta x^k), \quad (3)$$

$$b^k = 2 \sum_{e_{ij} \in \varepsilon} (e_{ij}(x^k))^T \Omega_{ij} \frac{\partial e_{ij}}{\partial \Delta x^k} \quad (4)$$

$$H^k = 2 \sum_{e_{ij} \in \varepsilon} \left(\frac{\partial e_{ij}}{\partial \Delta x^k}\right)^T \Omega_{ij} \frac{\partial e_{ij}}{\partial \Delta x^k}. \quad (5)$$

The updates $x^k$ are obtained by linearizing the edges as $$e_{ij}(x^{k+1}) \approx e_{ij}(x^k) + \frac{\partial e_{ij}}{\partial \Delta x^k} \Delta x^k \quad (6)$$

and substituting into (3), yielding the quadratic approximation $$\chi^2(x^{k+1}) \approx \frac{1}{2}(\Delta x^k)^T H^k \Delta x^k + (b^k)^T \Delta x^k + \chi^2(x^k) \quad (7)$$

This is minimized by $$\Delta x^k = -(H^k)^{-1} b^k \quad (8)$$

Most previously known solvers solve this linear system iteratively on a single node. However, such single-node solvers do not scale well with the size of the mapping region. This necessitates the need for scalable systems and algorithms to build HD Maps for larger areas.

SUMMARY

In accordance with one embodiment of the present disclosure, a method of solving a graph simultaneous localization and mapping (graph SLAM) for HD maps using a computing system includes partitioning a graph into a plurality of subgraphs, each of the subgraphs having all of the vertices of the graph and a subset of the edges of the graph. Constrained and non-constrained vertices are defined for the subgraphs. An alternating direction method of multipliers (ADMM) formulation for Graph SLAM is defined using the partitioned graph. A distributed Graph SLAM algorithm is then defined in terms of the constrained and non-constrained vertices based on the ADMM formulation. The distributed Graph SLAM algorithm is then used to solve the Graph SLAM problem for HD maps.

DETAILED DESCRIPTION

Figure 1:
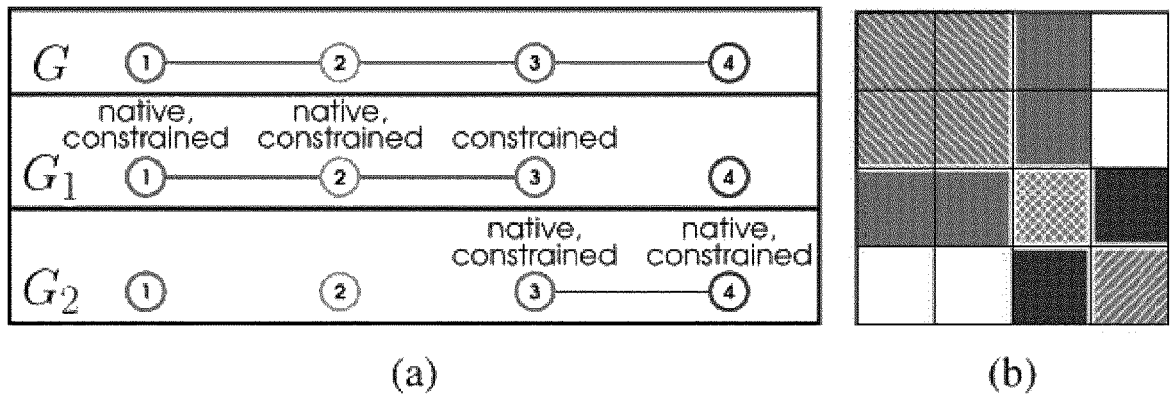
FIG. 1(a) shows how the vertices of subgraphs $G_1$ and $G_2$ of graph $G_S$ are defined.
FIG. 1(b) shows the constrained vertices of subgraphs $G_1$ and $G_2$.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

There are a variety of frameworks available for large-scale computation and storage. Such frameworks can be broadly categorized as, a. Single-node in-memory systems, where the entire data is loaded and processed in the memory of a single computer.

b. In-disk systems, where the entire data resides in disk, and chunks of it are loaded and processed in memory. Although there are not many available tools that adopts this approach for solving (1), most of the single-node solutions can be extended through the standard in-disk capabilities available in standard computation platforms. For example, memmapfile in MATLAB, mmap in Python, etc.

c. In-database systems, where the data is stored in a database and the processing is taken to the database where the data resides.

d. Distributed Storage and Computing systems, where the data resides in multiple nodes, and the computation is distributed among those nodes. Typical frameworks involve, Hadoop, Apache Spark (distributed in-memory analytics with storage on HDFS).

In one embodiment, the Apache Spark computing framework with the data stored in HDFS is used to implement the scalable Graph SLAM system. This offers several advantages. Firstly, compared to the existing single-node based solutions, the distributed architecture allows to scale-out the computation for large scale mapping. Further, compared to other distributed solutions like Hadoop; Spark provides a distributed in-memory computation with lazy execution. This makes it very fast and fault-tolerant, especially for iterative tasks compared to Hadoop(Map-Reduce) which needs to write all intermediate data to the disk. In alternative embodiments, any suitable computing framework may be used.

Utilizing such distributed architectures necessitates the adoption of advanced optimization algorithms that can handle the problem (1) at scale. Basically, the problem in (1) entails solving a quadratic program (QP) iteratively. Recent research towards solving such QPs in a distributed setting typically adopts one of the following approaches:

a. First Order methods, which use first order information from the objective like., gradient estimates, secant approximates etc. Such methods incur low per-iteration computation complexity and provide dimension independent convergence. However, the convergence rates heavily depend on the step-size selection and the conditionality of the problem.

b. Second Order methods, which use additional curvature information like, Hessian (or approximations like L-BFGS), and improves the conditionality of the problem. Such methods provide improved convergence rates but results to worse per-step computation costs.

c. Randomized algorithms, which use a subsampled or low rank representation of the original large scale data to solve a small scale equivalent problem.

Another broader class of algorithms adopt a splitting technique, which decouples the objective function into smaller sub-problems and solves them iteratively. The resulting sub-problems are easier to tackle and can be readily solved in a distributed fashion using the approaches discussed above. Some such popular algorithms are, Proximal Gradient methods, Proximal (quasi-) Newton methods, Alternating Direction Method of Multipliers (ADMM), etc. Of these approaches ADMM has been widely adopted to solve several large scale practical problems. There are several adaptations of the ADMM algorithm customized to utilize the structure of the problem. One such version well-suited for parallel and distributed settings is consensus ADMM.

Consensus ADMM in it's basic form solves the following problem, $$\min_{w_1,\ldots,w_S,z} \Sigma_{s=1}^S f_s(w_s) \qquad (9)$$

subject to $w_S=z$ $\forall s=1 \ldots S$.
The consensus ADMM steps are $$w_s^{l+1} = \operatorname*{argmin}_{w_s} f_s(w_s) + \frac{\rho}{2}\|w_s - z^l + u_s^l\|_2^2 \qquad (10)$$

$$z^{l+1} = \operatorname{argmin}I_{x_1^{l+1},\ldots,x_S^{l+1}}(z) + \frac{\rho}{2}\|w_s^{l+1} - z^l + u_s^l\|_2^2$$

$$= \frac{1}{s}\sum_{s=1}^S w_s^{l+1}$$

$$u_s^{l+1} = u_s^l + w_s^{l+1} - z^{l+1}.$$

Here, $I_{w_1,\ldots,w_S}(z)=\{z|w_1= \ldots =w_S=z\}$.

Note that, such a form is well-suited for distributed settings using the map-reduce paradigm in Spark. In this case, the w-step involves distributing (mapping) the computation over several nodes $\forall s=1 \ldots S$. And the (consensus) z-step involves aggregating (reducing) the distributed computations at the master node. Further, for (1), the $w_S$-update entails a closed form solution, and can be efficiently computed using standard linear solvers. Although (10) is guaranteed to converge, the convergence rate of the algorithm heavily depends on the conditionality of the problem (1), and the selection of the parameter $\rho$.

In order to utilize consensus ADMM for Graph SLAM, the graph $G=(v, \varepsilon)$ into a set of subgraphs $\{G_1, G_2, \ldots, G_S\}$ where each subgraph includes a number of vertices $v$ such that $v_1=v_2= \ldots =v_S=v$ and the sets of edges $\varepsilon$ satisfy $\cup_{s=1}^S \varepsilon_s=\varepsilon$ and $\varepsilon_s \cap \varepsilon_t = \emptyset$ if $s \neq t$. Define $$x_s^2(x_s^{k+1}) := \sum_{e_{ij} \in \varepsilon_s} (e_{ij}(x^k \boxplus \Delta x_s^k))^T \Omega_{ij} e_{ij}(x_s^k \boxplus \Delta x_s^k), \qquad (11)$$

$$b_s^k := 2\sum_{e_{ij} \in \varepsilon} (e_{ij}(x^k))^T \Omega_{ij} \frac{\partial e_{ij}}{\partial \Delta x^k} \in \mathbb{R}^{dN}, \qquad (12)$$

$$H_s^k := 2\sum_{e_{ij} \in \varepsilon} \left(\frac{\partial e_{ij}}{\partial \Delta x^k}\right)^T \Omega_{ij} \frac{\partial e_{ij}}{\partial \Delta x^k} \in \mathbb{R}^{dN}. \qquad (13)$$

Observe that the gradient and the Hessian matrix, respectively, are given by $$b^k = \sum_{s=1}^S b_s^k. \qquad (14)$$

$$H^k = \sum_{s=1}^S H_s^k, \qquad (15)$$

If $\Delta x_1^k = \Delta x_2^k = \ldots = \Delta x_S^k$, then $x^2(x^{k+1}) = \sum_{s=1}^S x_s^2(x_s^{k+1})$, $\qquad (16)$ $$\approx \frac{1}{2}\sum_{s=1}^S (\Delta x_S^k)^T H_S^k + \sum_{s=1}^S (b_S^k)^T \Delta x_S^k + \sum_{e_{ij} \in \varepsilon} (e_{ij}(x^k))^T \Omega_{ij} e_{ij}(x^k, x^k). \qquad (17)$$

Under the condition that $\Delta x_1^k = \Delta x_2^k = \ldots = \Delta x_S^k$, observe that (17) is equal to (7). Thus, our consensus ADMM formulation for Graph SLAM is $$\operatorname*{argmin}_{\Delta x_1^k,\ldots,\Delta x_N^k} \Sigma_{s=1}^S \frac{1}{2}(\Delta x_s^k)^T H_s^k \Delta x_s^k + (b_s^k)^T \Delta x_s^k, \qquad (18)$$

subject to $\Delta x_1^k = \Delta x_2^k = \ldots = \Delta_N^k$, and the resulting overrelaxed ADMM updates are $$\Delta x_s^{k,l+1} = -(H_s^k + \rho I)^{-1}(b_s^k + \rho u_s^{k,l} - \rho \Delta \bar{x}^{k,l}), \qquad (19)$$

$$z^{k,l+1} = \alpha \Delta \bar{x}^{k,l} + (1-\alpha)z^{k,l}, \qquad (20)$$

$$u_s^{k,l+1} = u_s^{k,l} + \alpha \Delta \bar{x}^{k,l+1} + (1-\alpha)z^{k,l} - z^{k,l+1} \qquad (21)$$

Henceforth, the superscript k will be omitted on the ADMM variables $\Delta x$, $z$, and $u$, and it should be understood that the ADMM iterations are performed as part of the $k^{th}$ Graph SLAM iteration.

While each subgraph G s contains all N vertices (i.e., $v_S=v$), it contains only a subset of the edges (i.e., $\varepsilon_S \subsetneq \varepsilon$). With that in mind, we define three different classes of vertices (see FIG. 1a for an illustration).

1) A constrained vertex of subgraph $G_S$ is a vertex which is constrained by at least one edge $e \in \varepsilon_S$. Let $N_S$ denote the number of constrained vertices in subgraph $G_S$. The entries in $\Delta x_S^l$ and us that correspond to constrained vertices are denoted as $\Delta \check{x}_S^l \in \mathbb{R}^{dN_S}$ and $\check{u}_S^l \in \mathbb{R}^{dN_S}$, respectively, and the corresponding entries in $b_S^k$ and rows/columns in $H_S^k$ are denoted by $\check{b}_S^k \in \mathbb{R}^{dN_S}$ and $\check{H}_S^k \in \mathbb{R}^{dN_S \times dN_S}$. Furthermore, let $\check{D}_S^k \in \mathbb{R}^{dN_S \times dN}$ denote the matrix which down-samples to the entries constrained in subgraph $G_S$ (i.e., $\check{D}_S \Delta \check{x}_S^l = \Delta \check{x}_S^l \in \mathbb{R}^{dN_S}$ and $\check{D}_S^T \Delta \check{x}_S^l \in \mathbb{R}^{dN}$).

2) A non-constrained vertex of subgraph $G_S$ is a vertex which is not constrained by any edges in $\varepsilon_S$. Let $\hat{D}_S \in \mathbb{R}^{d(N-N_S) \times dN}$ denote the matrix which down-samples to the entries not constrained in subgraph $G_S$. Let $v^l \in \mathbb{R}^{dN}$ denote the values assumed by the non-constrained entries in $u_1^l, \ldots, u_S^l$; in other words, $\hat{D}_S v^l = \hat{D}_S u_S^l \in \mathbb{R}^{d(N-N_S)}$ for all s.

3) When partitioning the graph, each vertex is designated to be a native vertex of exactly one subgraph for which it is a constrained vertex; when multiple subgraphs contain edges that constrain a vertex, the choice of its native subgraph must be decided. $v_{S,native}$ to denote the set of vertices which are native to subgraph $G_S$.

A simplified example of graph partitioning is depicted in FIG. 1. The graph G is partitioned into subgraphs $G_1$ and $G_2$. The graph G includes four columns and four rows. Referring to FIG. 1(b), the first subgraph $G_1$ contributes to rows and columns 1-3 of the Hessian, and the second subgraph $G_2$ contributes to rows and columns 3 and 4. The darker shaded regions indicate native, constrained vertices for subgraph $G_1$, and the lighter shaded areas indicate native, constrained vertices for subgraph $G_2$. The subgraphs' non-constrained vertices are not labeled.

To simplify notation, let us define $\check{v}_S^l := \check{D}_S v^l \in \mathbb{R}^{dN}$, and $\check{z}_S^l := \check{D}_S z^l \in \mathbb{R}^{dN}$, as the restriction to the entries of $v^l$ and $z^l$, respectively, that are constrained in subgraph $G_S$. Let us define a primal residual for subgraph $G_S$ as $$\phi_S^l := \Delta x_S^l - z^l \in \mathbb{R}^{dN} \qquad (22)$$

and, as before, let $$\check{\phi}_S^l := \Delta \check{x}_S^l - \check{z}_S^l = \check{D}_S \phi_S^l \in \mathbb{R}^{dN}, \qquad (23)$$

denote the restriction to entries that correspond to constrained vertices.

With these definitions in place, we can now break down the updates in terms of constrained and non-constrained vertices and present our distributed algorithm for solving Graph SLAM via ADMM:

$$\Delta \check{x}_s^{l+1} = -\left(\check{H}_s^k + \rho I\right)^{-1}\left(\check{b}_s^k + \rho \check{u}_s^l - \rho \check{z}_s^l\right) \qquad (24)$$

$$z^{l+1} = z^l - \alpha v^l + \frac{\alpha}{S} \sum_{s=1}^{S} \check{D}_s^T \left(\Delta \check{x}_s^{l+1} - \check{z}_s^l + \check{v}_s^l\right) \qquad (25)$$

$$\psi^{l+1} = z^{l+1} - z^l \qquad (26)$$

$$v^{l+1} = (1-\alpha)v^l - \psi^{l+1} \qquad (27)$$

$$\check{\phi}_s^{l+1} = \Delta \check{x}_s^{l+1} - \check{z}_s^{l+1} \qquad (28)$$

$$\check{\psi}_s^{l+1} = \check{z}_s^{l+1} - \check{z}_s^l \qquad (29)$$

$$\check{u}_s^{l+1} = \check{u}_s^l + \alpha \check{\phi}_s^{l+1} + (\alpha - 1)\check{\psi}_s^{l+1} \qquad (30)$$

$$\left\|\check{\phi}_s^{l+1}\right\|^2 = S\left\|\psi^{l+1} = v^k\right\|^2 + \sum_{s=1}^{S}\left\|\check{\phi}_s^{l+1}\right\|^2 - \left\|\check{\psi}_s^{l+1} + \check{v}_s^l\right\|^2. \qquad (31)$$

The algorithm presented above will converge . . . To obtain a symmetric, positive-definite matrix $E^k$ which can be used to precondition the objective function of (18) as $$\sum_{k=1}^{S} \frac{1}{2}(\Delta x_s^k)^T H_s^k \Delta x_s^k + (b_s^k)^T \Delta x_s^k = \qquad (32)$$

$$\sum_{k=1}^{S} \frac{1}{2}(\Delta x_s^k)^T E^k H_s^k E^k \Delta x_S^k + (b_S^k)^T E^k \Delta x_S^k =$$

$$\sum_{k=1}^{S} \frac{1}{2}(\Delta \tilde{x}_S^k)^T \tilde{H}_s^k \Delta \tilde{x}_S^k + (\tilde{b}_S^k)^T \Delta \tilde{x}_S^k.$$

The matrix $E^k$ should be selected such that it can be computed and applied in a distributed manner using the subgraphs. Preferably, the term $E_k H_S^k E^k = \Sigma_{S=1}^S E^k H_S^k E^k \approx I$. In order to achieve this, the Hessian $H_S^k$ is approximated for each subgraph using only contributions to the Hessian in rows and columns that correspond to vertices which are native to the subgraph (see FIG. 1(b)). For example, suppose $e_{ij}$ is a binary edge which constrains vertices $v_i$ and $v_j$. Let $\Delta x_i^k := 1_i \odot \Delta x^k$, where $\odot$ denotes element-wise multiplication and $1_i \in \mathbb{R}^{dN}$ denotes a vector which is 1 in entries that correspond to vertex $v_i$ and 0 elsewhere, and define $\Delta x_j^k$ accordingly. The edge may be defined as $$e_{[i,j]}(x^k \boxplus \Delta x^k) := e_{ij}(x^k) + \delta_{\substack{v_i \in v_{s,native} \\ v_j \notin v_{s,native}}} \frac{\partial}{\partial \Delta x_i'} e_{ij}(x^k \boxplus \Delta x')\Big|_{\Delta x'=0} \qquad (33)$$

$$\Delta x^k + \delta_{\substack{v_i \in v_{s,native} \\ v_j \notin v_{s,native}}} \frac{\partial}{\partial \Delta x_j'} e_{ij}(x^k \boxplus \Delta x')\Big|_{\Delta x'=0}$$

$$\Delta x^k + \delta_{\substack{v_i \in v_{s,native} \\ v_j \notin v_{s,native}}} \frac{\partial}{\partial \Delta x'} e_{ij}(x^k \boxplus \Delta x')\Big|_{\Delta x'=0} \Delta x^k$$

where $\delta$ is the Kronecker delta. Note that $e_{ij}(x) = e_{[ij]}(x)$, so the $x^2$ error and optimization problem remain unchanged. The native Hessian $H_{S,native}^k$ for a subgraph is defined as $$H_{s,native}^k := 2 \sum_{[ij] \in \varepsilon_s} \left(\frac{\partial e_{[ij]}}{\partial \Delta x^k}\right)^T \Omega_{ij} \frac{\partial e_{[ij]}}{\partial \Delta x^k}. \qquad (34)$$

Note that the supports of $H_{1,native}^k, \ldots, H_{S,native}^k$ are disjoint. This allows for fast, distributed computations, and so the preconditioning matrix is defined as $$E^k := (\Sigma_{S=1}^S H_{S,native}^k)^{-1/2} = \Sigma_{S=1}^S (H_{S,native}^k)^{-1/2} \qquad (35)$$

By redefining the edges, as in (33), more constraints can be accounted for which in turn enables the Hessian to be better approximates, yielding a better preconditioning matrix.

It is worth mentioning that a subgraph's Hessian $H_S^k$ and its native Hessian $H_{S,native}^k$ can both contain contributions that the other lacks. This is illustrated in FIG. 1, where edge $e_{23} \in \varepsilon_1$ constrains vertices $v_2 \in v_{1,native}$ and $v_3 \in v_{2,native}$. The Hessian $H_1^k$ contains contributions from edge $e_{23}$ in the (2, 2), (2, 3), (3, 2), and (3, 3) blocks, but $e_{23}$ only contributes to the (2, 2) block of $H_{1,native}^k$. On the other hand, the native Hessian $H_{2,native}^k$ contains the (3, 3) block contribution from $e_{23}$ but $H_2^k$ does not contain any contributions from $e_{23}$. As vertices $v_2$ and $v_3$ are native to different subgraphs, the (2, 3) and (3, 2) block contributions from edge $e_{23}$ do not contribute to any native Hessians—such is the price that must be paid to ensure that the algorithm remains distributed. This also demonstrates the importance of partitioning the graph in such a way that the number of edges that span different subgraphs is minimized.

Figure 2:
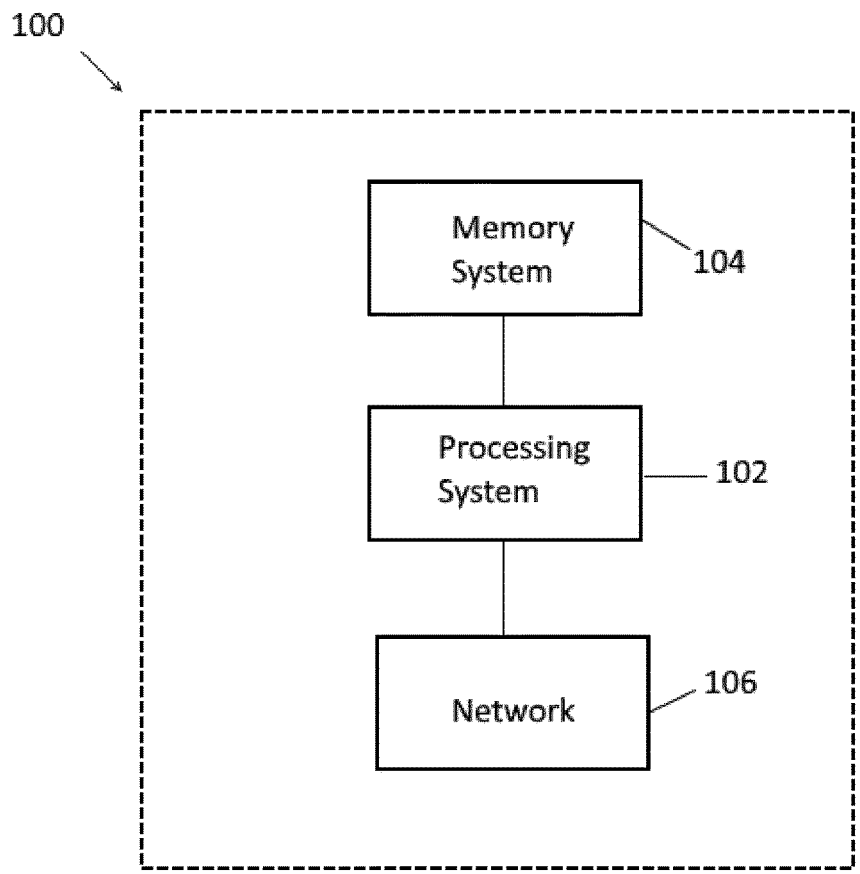
FIG. 2 is a schematic depiction of a computing system for implementing the distributed Graph SLAM algorithm for HD maps described herein.

FIG. 2 depicts an exemplary system 100 for implementing the scalable Graph SLAM framework described above. The system 100 includes a processing system 102 that is operatively connected to a memory system 104. The processing system 102 includes one or more processors which may be located in the same device/location or may be distributed across multiple devices at one or more locations. Any suitable type of processor(s) may be used.

The processing system is operably connected to the memory system 104. The memory system 104 may include any suitable type of non-transitory computer readable storage medium. The memory system 104 may be distributed across multiple devices and/or locations. Programmed instructions are stored in the memory system. The programmed instructions include the instructions for implementing the operating system and various functionality of the system. The programmed instructions also include instructions for implementing the scalable Graph SLAM and ADMM algorithms described herein.

The components of the system may be communicatively connected by one or more networks 106. Any suitable type of network(s) may be used including wired and wireless types of networks. The computing devices include the appropriate network interface devices that enable transmitting and receiving of data via the network(s).

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A computer-implemented method of solving a graph simultaneous localization and mapping (graph SLAM) problem for HD maps using a distributed computing system, the method comprising:
   partitioning a graph into a plurality of subgraphs using at least one processor of the distributed computing system, the graph including a plurality of vertices and a plurality of edges that extend between vertices, each of the vertices corresponding to a pose during mapping, each of the edges defining a spatial constraint between two vertices, wherein each of the subgraphs includes all of the vertices of the graphs, and wherein each of the subgraphs include a subset of the edges of the graph;
   defining constrained, non-constrained and native vertices for each of the subgraphs using the at least one processor;
   defining an alternating direction method of multipliers (ADMM) formulation for Graph SLAM based on the partitioned graph using the at least one processor;
   defining updates for the ADMM formulation based on the ADMM algorithm using the at least one processor;
   defining updates for a distributed Graph SLAM algorithm based on the updates for the ADMM formulation and in terms of the constrained and the non-constrained vertices of the subgraphs using the at least one processor; and
   solving the updates for the distributed Graph SLAM algorithm to solve the Graph SLAM problem for HD maps using the at least one processor to provide a distributed computing solution for the Graph SLAM problem for HD maps,
   wherein the ADMM formulation is a consensus ADMM formulation given by $$\operatorname*{argmin}_{\Delta x_1^k, \ldots, \Delta x_N^k} \sum_{s=1}^{S} \frac{1}{2} (\Delta x_s^k)^T H_s^k \Delta x_s^k + (b_s^k)^T \Delta x_S^k,$$

subject to $\Delta x_1^k = \Delta x_2^k = \ldots = \Delta x_N^k$ wherein k is a number of iterations,
wherein s is a number of graph nodes,
wherein T is a number of the poses,
wherein $\Delta x^k \in \mathbb{R}^{dN}$ denotes an updated pose,
wherein $b^k \in \mathbb{R}^{dN}$ denotes a gradient of cost functional error, and
wherein $H_s^k$ is a Hessian matrix of the cost functional error.

2. The method of claim 1, wherein the updates for the consensus ADMM formulation are given by $$\Delta x_s^{k,l+1} = -(H_s^k + \rho I)^{-1}(b_s^k + \rho u_s^{k,l} - \rho \Delta \bar{x}^{k,l}),$$

$$z^{k,l+1} = \alpha \Delta \bar{x}^{k,l} + (1-\alpha) z^{k,l},$$

$$u_s^{k,l+1} = u_s^{k,l} + \alpha \Delta \bar{x}^{k,l+1} + (1-\alpha) z^{k,l} - z^{k,l+1},$$

wherein $\rho$ is a parameter,
wherein $I_{w_1, \ldots, w_S}(z) = \{z | w_1 = \ldots = w_S = z\}$,
wherein z and u are variables of the consensus ADMM formulation.

3. The method of claim 2, wherein $\check{v}_s^l := \check{D}_s v^l \in \mathbb{R}^{dN}$ define restriction of entries of $v^l$ and $z^l$ respectively, that are constrained in subgraph $G_s$,
   wherein a primal residual for subgraph $G_s$ is defined as $\phi_s^l := \Delta x_s^l - z^l \in \mathbb{R}^{dN}$, and
   wherein $\check{\phi}_s^l := \Delta \check{x}_s^l - \check{z}_s^l = \check{D}_s \phi_s^l \in \mathbb{R}^{dN}$ denotes restriction to entries that correspond to constrained vertices.

4. The method of claim 3, wherein the updates for the distributed Graph SLAM algorithm are defined in terms of constrained and non-constrained vertices such that $$\Delta \tilde{x}_s^{l+1} = -\left(\tilde{H}_s^k + \rho I\right)^{-1}\left(\tilde{b}_s^k + \rho \tilde{u}_s^l - \rho \tilde{z}_s^l\right)$$

$$z^{l+1} = z^l - \alpha v^l + \frac{\alpha}{S} \sum_{k=1}^{S} \tilde{D}_s^T \left(\Delta \tilde{x}_s^{l+1} - \tilde{z}_s^l + \tilde{v}_s^l\right)$$

$$\psi^{l+1} = z^{l+1} - z^l$$

$$v^{l+1} = (1-\alpha)v^l - \psi^{l+1}$$

$$\tilde{\phi}_s^{l+1} = \Delta \tilde{x}_s^{l+1} - \tilde{z}_s^{l+1}$$

$$\tilde{\psi}_s^{l+1} = \tilde{z}_s^{l+1} - \tilde{z}_s^l$$

$$\tilde{u}_s^{l+1} = \tilde{u}_s^l + \alpha \tilde{\phi}_s^{l+1} + (\alpha - 1)\tilde{\psi}_s^{l+1}$$

$$\left\|\tilde{\phi}_s^{l+1}\right\|^2 = S\|\psi^{k+1} = v^k\|^2 + \sum_{k=1}^{S} \left\|\tilde{\phi}_s^{k+1}\right\|^2 - \left\|\tilde{\psi}_s^{k+1} + \tilde{v}_s^l\right\|^2.$$

5. The method of claim 1, wherein the computing system comprises a distributed storage and computing system where the data resides in multiple nodes, and the computation is distributed among those nodes.

6. The method of claim 5, wherein the computing system has an Apache Spark framework with data stored on a Hadoop Distributed File System (HDFS).

* * * * *

UNITED STATES PATENT AND TRADEMARK OFFICE
CERTIFICATE OF CORRECTION

PATENT NO. : 11,892,297 B2
APPLICATION NO. : 16/971413
DATED : February 6, 2024
INVENTOR(S) : Ramakrishnan et al.

Page 1 of 1

It is certified that error appears in the above-identified patent and that said Letters Patent is hereby corrected as shown below:

In the Claims

In Claim 3, at Column 8, Line 27, the following should be inserted before the word "define":
--; and $\check{z}_s^l := \check{D}_s z^l \in \mathbb{R}^{dN}$--.

In Claim 4, at Column 8, Line 53:
"$\left\|\bar{\phi}_s^{l+1}\right\|^2 = S\left\|\psi^{k+1} + v^k\right\|^2 + \sum_{s=1}^{S}\left\|\check{\phi}_s^{k+1}\right\|^2 - \left\|\check{\psi}_s^{k+1} + \check{v}_s^l\right\|^2$,"
Should read:
--$\left\|\phi^{l+1}\right\|^2 = S\left\|\psi^{k+1} + v^k\right\|^2 + \sum_{s=1}^{S}\left\|\check{\phi}_s^{k+1}\right\|^2 - \left\|\check{\psi}_s^{k+1} + \check{v}_s^l\right\|^2$--.

Signed and Sealed this
Seventeenth Day of September, 2024

Katherine Kelly Vidal
*Director of the United States Patent and Trademark Office*